(No Model.)
T. J. CHAPPELL.
Elevator for Harvester-Header.
No. 228,035.  Patented May 25, 1880.
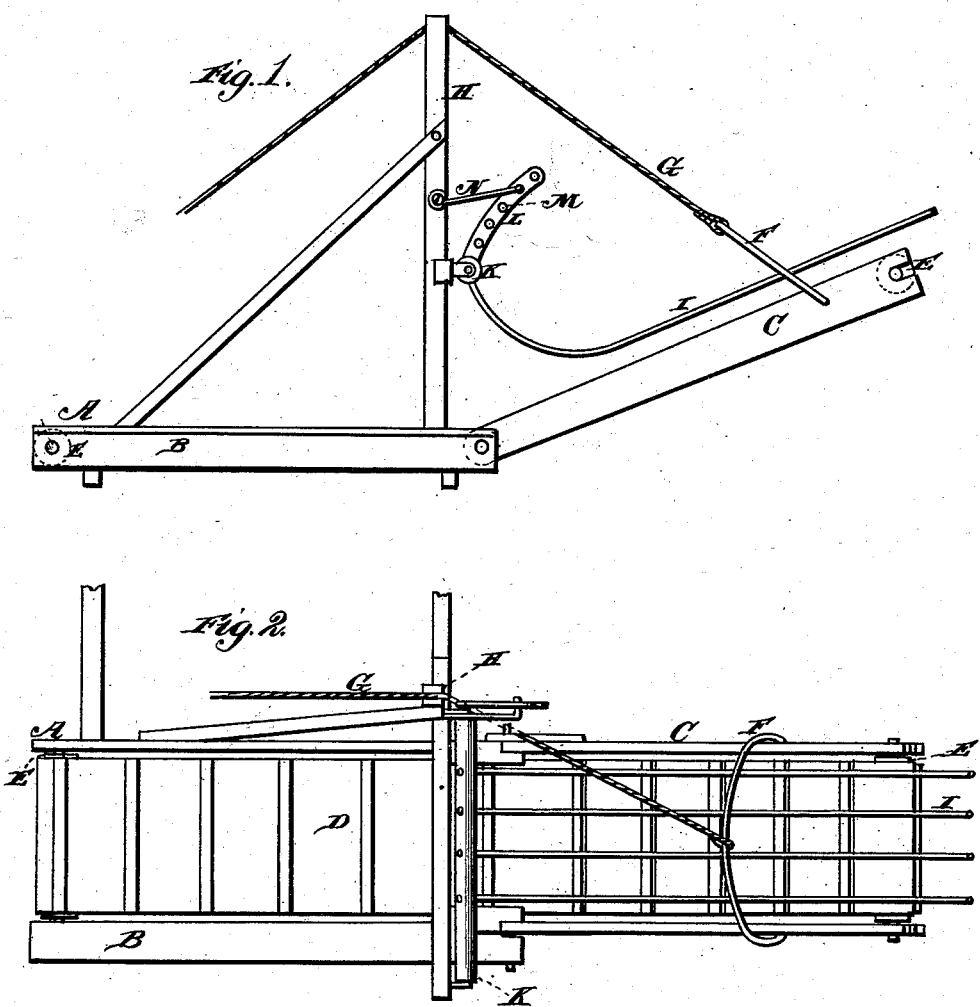

UNITED STATES PATENT OFFICE.

THOMAS J. CHAPPELL, OF GILROY, CALIFORNIA.

ELEVATOR FOR HARVESTER-HEADERS.

SPECIFICATION forming part of Letters Patent No. 228,035, dated May 25, 1880.

Application filed March 20, 1880. (No model.)

*To all whom it may concern:*

Be it known that I, THOMAS J. CHAPPELL, of Gilroy, in the county of Santa Clara and State of California, have invented certain new and useful Improvements in Elevators for Harvester-Headers; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side elevation of my elevators for harvester-headers, and Fig. 2 is a plan view of the same.

My present invention relates to elevators for harvester-headers; and it consists, essentially, in a series of fingers arranged to be lowered upon the grain or raised to a vertical, or nearly vertical, plane, so that the header may be passed between the posts of gates which may be between adjacent fields.

Let A designate the frame of the horizontal platform, and B the sickle-bar. C is the frame of the incline, which is hinged to the horizontal platform. D designates the usual endless band, which passes around the rollers E E, and constitutes the traveling platform for carrying the grain up to the wagon or receptacle into which it is discharged. F is a bail hinged to the incline, and G a rope or cord passed over the post H, for controlling the angle of the incline.

I represents the curved fingers, which are secured in a shaft, K, and arranged over the incline. The shaft K is journaled in an arm of the reel-post, and has at one end a segmental plate or bar, L, formed with a series of holes, M, for the reception of a hook, N. This hook is hinged to the post H, and by its engagement with the bar L will maintain the fingers at any required angle. Hence the fingers may be set so as to press lightly upon the grain as it travels up the elevator, or they may be raised so that the machine may be passed between the posts of a gate.

What I claim is—

The combination of the incline C with the fingers I, shaft K, perforated plate or bar L, and a latch or hook, N, substantially as shown and set forth.

In testimony that I claim the above I have hereunto subscribed my name in the presence of two witnesses.

THOS. JASPER CHAPPELL.

Witnesses:
J. T. RICKETTS,
ROBIN R. CAMPBELL.